May 8, 1956

N. SWERDLOW 2,744,654

CLOSURE FASTENER AND HINGE CONSTRUCTION

Filed May 10, 1954

Inventor:
Nathan Swerdlow,
by J. Wesley Hambrier
His Attorney.

United States Patent Office 2,744,654
Patented May 8, 1956

2,744,654

CLOSURE FASTENER AND HINGE CONSTRUCTION

Nathan Swerdlow, Philadelphia, Pa., assignor to General Electric Company, a corporation of New York Application May 10, 1954, Serial No. 428,652

9 Claims. (Cl. 220—55)

This invention relates to a hinge construction and, more particularly, to a simple, low-cost hinge construction wherein a bolt is arranged to serve both as a hinging and a clamping device.

In many types of apparatus it is frequently necessary to provide a hinged cover or door which is arranged to be clamped against a compressible gasket in order to seal an opening in the apparatus. If such a gasket is located closely adjacent the hinge, there is a serious danger that the cover, in swinging about its hinge, will unevenly compress and decompress the gasket, thereby rapidly destroying the sealing ability of the gasket. To protect the gasket against such destructive wiping action, certain prior arrangements have utilized hinge structures which permit the gasket to be evenly decompressed before the cover is swung to its open position. Since such prior hinge arrangements have merely permitted, rather than required, such initial decompression, a careless operator might still swing the cover open in such a manner as to subject the gasket to destructive uneven decompression.

Accordingly, it is an object of my invention to provide, for a hinged cover which is arranged to be clamped against a compressible gasket, a novel hinge structure which requires that the gasket be evenly decompressed before the cover can be swung about the hinge structure.

It is a further object of my invention to provide a hinge structure comprising a bolt which is capable of functioning both as a hinging and a clamping device.

It is a further object of my invention to provide a hinge structure which not only is capable of performing the above desired functions but also is of a simple, reliable, and inexpensive construction.

In accordance with one form of my invention there is provided a bolt having two portions pivotally joined together by a pivot pin. This bolt, which extends rotatably through a cover and is threaded into a socket portion of a frame, is arranged so that, when tightened, it compresses a gasket between the cover and the frame. If the bolt is loosened, the cover may be swung about the pivot pin, but the socket has interference portions which prevent this swinging action from taking place unless the bolt has been sufficiently loosened to essentially completely decompress the gasket.

Figure 1:
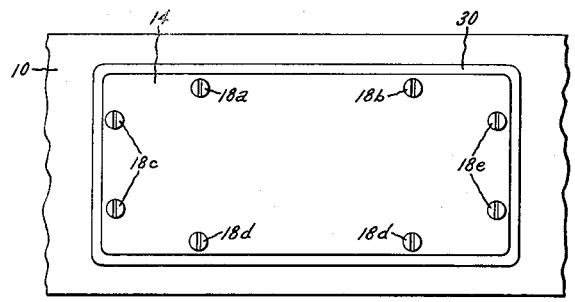
Figure 2:
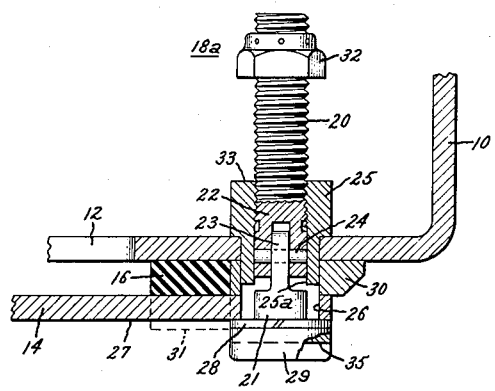
Figure 3:
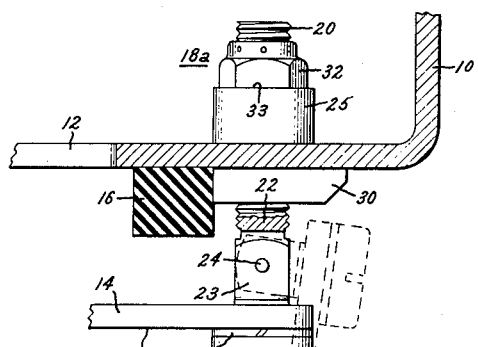
Figure 4:
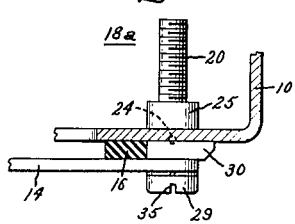

For a better understanding of my invention, reference may be had to the accompanying drawing wherein Fig. 1 is a bottom plan view showing a cover bolted against a frame by hinge-bolts constructed in accordance with my invention. Fig. 2 is an enlarged cross-sectional view of one of the hinge-bolt joints, the hinge-bolt being shown in its fully tightened, gasket-compressing prosition. Fig. 3 is a view similar to Fig. 2 except that the hinge-bolt has been sufficiently loosened to decompress the gasket and to permit swinging of the cover. The solid lines indicate the position of the parts prior to the swinging action, and the dotted lines indicate the position of the parts after the swinging action. Fig. 4 illustrates a slightly modified form of the invention.

Referring more specifically to the drawing, I have shown a frame 10 which is capable of serving as an enclosure for any suitable apparatus. This frame 10 is provided with an opening 12 which is arranged to be sealed by a cover 14. Interposed between the frame and the cover is a compressible gasket 16 which, when compressed, is capable of providing an effective seal between the cover and the frame.

For mounting the cover on the frame in gasket-compressing relationship, there are provided a series of bolts 18a, b, c, d, and e. The bolts 18a and 18b are hinge-bolts constructed in accordance with my invention and, as a result, each is capable of serving both as a clamping and a hinging device. The bolts 18c, d, and e may be of any suitable form but, preferably, are of such a construction as to be interchangeable with the hinge-bolts 18a and 18b.

Referring now to Fig. 2 for a detailed showing of a hinge-bolt, such as 18a, it will be seen that the bolt is of a simple construction comprising a threaded body portion 20 and a headed shank portion 21. The body portion is grooved to provide a clevis 22 which receives a tongue 23 formed on the shank portion 21. The two portions of the hinge-bolt are pivotally joined together by means of a transversely-extending pivot pin 24 which extends through registering openings formed in the tongue and clevis. For receiving the screw-threaded hinge-bolt in meshing relationship, there is provided an internally threaded nut or socket 25 which is secured to the frame 10, as by welding or by a press-fit. The headed shank 21 extends through an opening 26 provided in the cover 14 and acts against the outer surface 27 of the cover through a suitable lock washer 28. Thus it may be seen that when the hinge-bolt is tightened by torque applied through its head 29, it will force the cover 14 toward the frame in gasket-compressing relationship. This compression will be limited by an apertured frame-reinforcing member 30 through which the bolt is arranged to pass. In Fig. 2 the bolt is shown in its fully tightened position with the gasket being fully compressed. The dotted lines 31 indicate the configuration of the gasket 16 when completely decompressed.

Now when it is desired to swing the cover 14 to an open position, it is most important that the gasket 16 be completely and evenly decompressed prior to initiation of the swinging action. This action is insured in my hinge construction by the fact that no pivoting action of the cover 12 may take place until the hinge-bolts have been sufficiently loosened to completely decompress the gasket 16. More particularly, the pivot pin 24 is arranged to provide a pivot axis about which the cover, together with the headed shank 21, may swing. No swinging action about this axis is possible, however, until the bolt 18a has been sufficiently loosened to completely withdraw the tongue 23 of the shank 21 from the socket 25. Only after this tongue 23 has cleared the socket is it possible to swing the cover 14 and the shank 21 about pivot pin 24. When the bolt is loosened to the point wherein the tongue can clear the socket, the gasket will be completely decompressed and free to assume its dotted line position of Fig. 2. Prior to that point, internal surface portions 25a of the socket 25 are arranged to engage the tongue so as to restrain the shank 21 and the body portion 20 in generally aligned relationship and thereby to interfere to prevent swinging of the shank 21 about the pivot pin 24.

Preferably, the internal threads of the socket 25 terminate short of the inner end of the socket, so that the interference surface portions 25a are unthreaded. As a result, these surfaces 25a may engage the shank and effectively resist pivotal movement without the possibility of surface damage. Although in the preferred form of my invention, the interference portions are formed on the socket 25, it will be apparent that the parts of the hinge-bolt could be proportioned so that some other portion of the frame interfered with either the cover or the shank to prevent premature pivotal motion.

Fig. 3 shows the hinge-bolt 18a sufficiently loosened to permit swinging of the shank and the cover about the pivot pin 24. It is to be noted that in this position the gasket 16 is completely free from compression by the bolt 18a. Accordingly, it will be apparent that when the bolt 18a has been loosened to this position and the remaining bolts are suitably loosened or withdrawn, the cover is free to swing from its solid line position to its dotted line position of Fig. 3 without contacting or distorting the gasket in any way.

To limit the withdrawal of the bolt 18a and to insure that, before swinging of the cover is attempted, the axis of the pivot pin 24 will be substantially aligned with the axis of a similar pivot pin in identical hinge-bolt 18b, there is provided a lock nut 32 mounted on the threaded inner end of each of the bolts 18a and 18b. This lock nut is so adjusted on each of the bolts 18a and 18b that when it contacts the inner surface 33 of the socket 25 (as shown in Fig. 3), the axes of the pivot pins 24 will be in substantial alignment. Thus, the presence of lock nuts 32 permits an operator, after having withdrawn the other clamping bolts, to quickly loosen the two hinge-bolts 18a and 18b to limit positions and to initiate swinging action of the cover without requiring wasted time or effort in aligning the axes of the pivot pins 24.

Although I have described an embodiment of my invention wherein the bolts at only one side of the cover are hinge-bolts, my invention is not limited to such an arrangement. For example, if the stop nuts 32 are omitted, as shown in Fig. 4, all of the bolts 18a–e may be hinge-bolts. With such an arrangement, it is possible to selectively swing the cover 14 about those hinge-bolts disposed at any one of its four sides. In such a modified arrangement, alignment of the axes of the pivot pins 24 would be effected by sight. For example, the tool-receiving slot 35 in the head of each bolt would be prearranged to align with the axis of its pivot pin. Thus, when the slots of the two selected hinge-bolts would be aligned, the operator would then have an indication that the pivot pin axes were aligned and, accordingly, that the cover could then be swung open.

This visual aid which is provided by disposing the tool-receiving slot 35 and the pivot pin 24 in angularly aligned relationship can be utilized in the embodiment of Fig. 2 as well as in the embodiment of Fig. 4. As shown in Fig. 2, the pivot pin 24 and the slot 35 are angularly aligned, and, thus, the slots 35 of the hinge-bolts provide an additional aid to aligning the pivot pins 24 of the cooperating bolts.

While I have illustrated certain specific embodiments of my invention, it is to be understood that certain changes may be made therein without departing from the spirit of my invention.

What I claim as new and desire to secure by Letters Patent of the United States is:

1. In combination, a frame including an internally threaded socket, a cover mounted on said frame, a compressible gasket interposed between said cover and said frame, a bolt extending into said socket through a portion of said cover and rotatable relative to said cover and to said socket, said bolt comprising a headed shank and a threaded body portion meshing with said internally threaded socket whereby tightening of said bolt is effective to compressively clamp said gasket between said cover and said frame, a pivot pin pivotally joining said shank to said body portion and defining an axis about which said shank and said cover are adapted to pivot, said socket having an interference portion which is arranged to engage said shank in pivotal-motion-preventing relationship at least until said bolt is sufficiently loosened to substantially completely decompress said gasket.

2. In combination, a frame including an internally threaded socket portion, a cover mounted on said frame, a compressible gasket interposed between said cover and said frame, a bolt extending into said socket portion through a portion of said cover and rotatable relative to said cover and to said socket, said bolt comprising a headed shank and a threaded body portion meshing with said internally threaded socket portion whereby tightening of said bolt is effective to compressively clamp said gasket between said cover and said frame, a pivot pin pivotally joining said shank to said body portion and defining an axis about which said shank and said cover are adapted to pivot, said frame having an interference portion which is arranged to engage one of said pivotally-mounted parts in pivotal-motion-preventing relationship at least until said bolt is sufficiently loosened to substantially completely decompress said gasket.

3. In combination, a frame including an internally threaded socket, a cover mounted on said frame, a compressible gasket interposed between said cover and said frame, a bolt extending into said socket through a portion of said cover and being rotatable relative to said cover and to said socket, said bolt comprising a headed shank and a threaded body portion meshing with said internally threaded socket whereby tightening of said bolt is effective to compressively clamp the gasket between said cover and said frame, a pin pivotally joining said shank to said body and defining an axis about which said shank and said cover are adapted to pivot, said socket having an interference portion which is arranged to restrain said shank and said body in generally aligned relationship during the entire time that the gasket is compressed by the bolt.

4. In combination, a frame including an internally threaded socket, a cover mounted on the frame, a compressible gasket interposed between the cover and the frame, a bolt extending into said socket through a portion of said cover and being rotatable relative to said frame and to said socket, said bolt comprising a headed shank and a threaded body portion meshing with said internally threaded socket whereby tightening of said bolt is effective to compressively clamp the gasket between the cover and the frame, a pivot pin pivotally joining said shank to said body and defining an axis about which said shank and said cover are adapted to pivot, interference means operative during the entire time that said gasket is compressed by said bolt to prevent pivotal motion of said cover about said axis.

5. The combination of claim 4 in which said interference means comprises structure fixedly associated with said frame.

6. The combination of claim 4 in which said interference means comprises structure fixedly associated with said frame and disposed closely adjacent to said shank.

7. In combination, a frame including a pair of internally threaded sockets, a cover mounted on the frame, a compressible gasket interposed between said cover and said frame, a pair of bolts each of which extends into one of said sockets through a portion of said cover and is rotatable relative to said cover and to said socket, each of said bolts comprising a headed shank and a threaded body portion meshing with one of said internally threaded sockets whereby tightening of the bolts is effective to compressively clamp the gasket between the cover and the frame, a pivot pin pivotally joining the shank and the body of each of said bolts and defining an axis about which said shank and said cover are adapted to pivot, interference means operative to prevent pivotal movement of said shank and said cover about said axis during the entire time that the gasket is under compression from either of said bolts, a stop mounted on each of said body portions and arranged to prevent loosening of each of said bolts beyond a predetermined limit position wherein said gasket is free of compression from said bolts, said pivot axes being generally aligned when said bolts are loosened to their respective limit positions.

8. In combination, a frame including a pair of internally threaded sockets, a cover mounted on the frame, a compressible gasket interposed between said cover and said frame, a pair of bolts each of which extends into one of said sockets through a portion of said cover and is rotatable relative to said cover and to said socket, each of said bolts comprising a headed shank and a threaded body portion meshing with one of said internally threaded sockets whereby tightening of the bolts is effective to compressively clamp the gasket between the cover and the frame, a pivot pin pivotally joining the shank and the body of each of said bolts and defining an axis about which said shank and said cover are adapted to pivot, interference means operative to prevent pivotal movement of said shank and said cover about said axis during the entire time that the gasket is under compression from either of said bolts, a slot formed in the head of each of said shanks and arranged in substantial angular alignment with the shank pivot axis whereby to provide an indication of the alignment of the pivot axes of said pair of bolts.

9. In combination, a frame including an internally threaded socket, a cover mounted on said frame, a bolt extending into said socket through a portion of said cover and being rotatable relative to said cover and to said socket, said bolt comprising a headed shank and a threaded body portion meshing with said internally threaded socket whereby tightening of said bolt is effective to clamp said cover against said frame, a pin pivotally joining said shank to said body and defining an axis about which said shank and said cover are adapted to pivot when said bolt is loosened, the head of said shank having at least one flattened surface for receiving a torque-applying tool for tightening and loosening said bolt, said flattened surface extending generally parallel to said pivot axis whereby to provide an indication of the position of said axis.

References Cited in the file of this patent
UNITED STATES PATENTS

| | | |
|---|---|---|
| 370,028 | Votaw | Sept. 13, 1887 |
| 676,486 | Beaver | June 18, 1901 |
| 1,337,733 | Sweetland et al. | Apr. 20, 1920 |
| 2,522,964 | Rowe | Sept. 19, 1950 |

FOREIGN PATENTS

| | | |
|---|---|---|
| 10,046 | Great Britain | 1893 |